(12) United States Patent
Rigatti

(10) Patent No.: US 12,518,121 B2
(45) Date of Patent: *Jan. 6, 2026

(54) SYSTEMS AND METHODS FOR SYNCHRONIZATION MECHANISMS FOR MAGNETIC CARDS AND DEVICES

(71) Applicant: Dynamics Inc., Cheswick, PA (US)

(72) Inventor: Christopher J. Rigatti, Pittsburgh, PA (US)

(73) Assignee: Dynamics Inc., Cheswick, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,862

(22) Filed: Mar. 11, 2024

(65) Prior Publication Data

US 2025/0013846 A1 Jan. 9, 2025

Related U.S. Application Data

(63) Continuation of application No. 15/482,392, filed on Apr. 7, 2017, now Pat. No. 11,941,469, which is a continuation of application No. 13/681,586, filed on Nov. 20, 2012, now Pat. No. 9,619,741.

(60) Provisional application No. 61/562,251, filed on Nov. 21, 2011.

(51) Int. Cl.
*G06K 19/06* (2006.01)
*G06K 7/08* (2006.01)

(52) U.S. Cl.
CPC ....... *G06K 19/06206* (2013.01); *G06K 7/084* (2013.01)

(58) Field of Classification Search
CPC .................. G06K 19/06206; G06K 7/084
See application file for complete search history.

(56) References Cited

U.S. PATENT DOCUMENTS

| 4,492,855 | A | * | 1/1985 | Garczynski | G06K 13/08 |
| | | | | | 235/458 |
| 8,317,103 | B1 | * | 11/2012 | Foo | G06K 19/06187 |
| | | | | | 235/449 |
| 11,941,469 | B1 | * | 3/2024 | Rigatti | G06K 7/084 |

* cited by examiner

*Primary Examiner* — Sonji N Johnson
(74) *Attorney, Agent, or Firm* — Morris Law Group; Robert W. Morris

(57) ABSTRACT

A processor of a card may detect variations (e.g., position, velocity, acceleration and direction) of a read head in relation to the card. Based on certain parameters (e.g., card length, initially detected read head position, and read head velocity) a processor of a card may adjust synchronization bit patterns that may synchronize communications between the card and a read head of a magnetic stripe reader. A processor of a card may generate a number of leading synchronization bits that is different than a number of trailing synchronization bits.

20 Claims, 6 Drawing Sheets

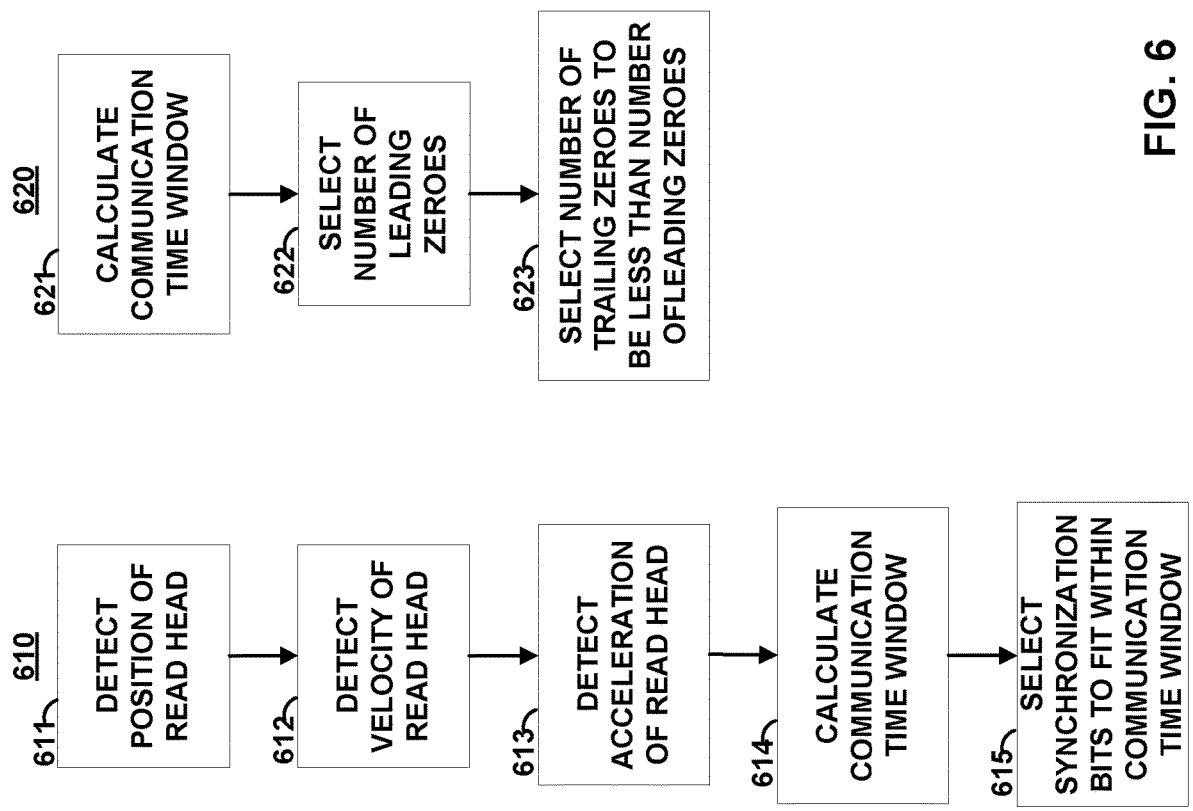

SYSTEMS AND METHODS FOR SYNCHRONIZATION MECHANISMS FOR MAGNETIC CARDS AND DEVICES

CROSS-REFERENCE TO RELATED APPLICATION

This application claims the benefit of U.S. Provisional Patent Application No. 61/562,251, titled "SYSTEMS AND METHODS FOR SYNCHRONIZATION MECHANISMS FOR MAGNETIC CARDS AND DEVICES," filed Nov. 21, 2011, which is hereby incorporated by reference herein in its entirety.

BACKGROUND OF THE INVENTION

This invention relates to magnetic cards and devices and related systems.

SUMMARY OF THE INVENTION

A card may include a dynamic magnetic communications device, which may take the form of a magnetic encoder or a magnetic emulator. A magnetic encoder, for example, may be utilized to modify information that is located on a magnetic medium, such that a magnetic stripe reader may then be utilized to read the modified magnetic information from the magnetic medium. A magnetic emulator, for example, may be provided to generate electromagnetic fields that directly communicate data to a read-head of a magnetic stripe reader. A magnetic emulator, for example, may communicate data serially to a read-head of the magnetic stripe reader. A magnetic emulator, for example, may communicate data in parallel to a read-head of the magnetic stripe reader.

All, or substantially all, of the front surface, as well as the rear surface, of a card may be implemented as a display (e.g., bi-stable, non bi-stable, LCD, or electrochromic display). Electrodes of a display may be coupled to one or more touch sensors, such that a display may be sensitive to touch (e.g., using a finger or a pointing device) and may be further sensitive to a location of the touch. The display may be sensitive, for example, to objects that come within a proximity of the display without actually touching the display.

A dynamic magnetic stripe communications device may be implemented on a multiple layer board (e.g., a two-layer flexible printed circuit board). A coil for each track of information that is to be communicated by the dynamic magnetic stripe communications device may then be provided by including wire segments on each layer and interconnecting the wire segments through layer interconnections to create a coil. For example, a dynamic magnetic stripe communications device may include two coils such that two tracks of information may be communicated to two different read-heads included in a read-head housing of a magnetic stripe reader. A dynamic magnetic stripe communications device may include, for example, three coils such that three tracks of information may be communicated to three different read-heads included in a read-head housing of a magnetic stripe reader.

Input and/or output devices may be included on a card, for example, to facilitate data exchange with the card. For example, an integrated circuit (IC) may be included on a card and exposed from the surface of the card. Such a chip (e.g., an EMV chip) may communicate information to a chip reader (e.g., an EMV chip reader). An RFID antenna or module may be included on a card, for example, to send and/or receive information between an RFID writer/reader and the RFID included on the card.

One or more detectors may be provided in a card, for example, to sense the presence of an external object, such as a person or device, which in turn, may trigger the initiation of a communication sequence with the external object. The sensed presence of the external object may then be communicated to a processor of the card, which in turn may direct the exchange of information between a card and the external object. Accordingly, timing aspects of the information exchange between an external object and the various I/O devices provided on a card may also be determined by circuitry (e.g., a processor) provided on a card.

The sensed presence of the external object or device may include the type of object or device that is detected and, therefore, may then determine the type of communication that is to be used with the detected object or device. For example, a detected object may include a determination that the object is a read-head housing of a magnetic stripe reader. Such an identifying detection, for example, may activate a dynamic magnetic stripe communications device so that information may be communicated to the read-head of the magnetic stripe reader. Information may be communicated by a dynamic magnetic stripe communications device, for example, by re-writing magnetic information on a magnetic medium that is able to be read by a magnetic stripe reader or electromagnetically communicating data to the magnetic stripe reader.

One or more read-head detectors, for example, may be provided on a card. The one or more read-head detectors may be provided as, for example, conductive pads that may be arranged along a length of a card having a variety of shapes. A property (e.g., a capacitance magnitude) of one or more of the conductive pads may, for example, change in response to contact with and/or the presence of an object. A card may be laminated such that all electronic circuitry and components (e.g., read-head detectors) are covered in a polymer. For example, an electronics package may be provided between two layers of polymer and a liquid polymer may be introduced between these layers and hardened to form a card.

A card may, for example, be swiped across a read-head of a magnetic stripe reader, such that a series of conductive pads arranged along a length of the card may be used to sequentially detect the presence of the read-head as the read-head moves in relation to the card. In doing so, a series of detections (e.g., the capacitance magnitude of each conductive pad may increase and/or decrease) may be generated, which may be indicative of a direction of a card swipe and/or a velocity of a card swipe and/or an acceleration of a card swipe. Changes in the velocity and/or acceleration of a card swipe during a card swipe may be detected by read-head detectors. Such information may be provided to circuitry (e.g., a processor) so that the information may be utilized to change the control of a dynamic magnetic stripe communications device. A dynamic magnetic stripe communications device may include, for example, multiple communication tracks such that multiple tracks of data may be communicated to a magnetic stripe reader.

A processor, or other circuitry, of a card may, for example, utilize a detection mechanism to determine a position of a read-head in relation to the card. Accordingly, a processor of a card may determine, for example, a relative position of a read head at the instant the read head is detected. Additionally, a processor of a card may determine, for example, a relative speed at which a read head may be moving across a card. In so doing, a processor of a card may determine an amount of time that the read head may remain over the card.

For example, a card length may, for example, be approximately 3.375 inches. The thickness of a card may be between, for example, approximately 27 to 33 thousandths of an inch thick (e.g., approximately 30-33 thousandths of an inch thick). By detecting a relative position of a read head and a relative velocity of the read head, for example, a processor of a card may determine a length of time that the read head may remain within a communication distance of the card.

A dynamic magnetic stripe communications device of a card may, for example, communicate a particular amount of data to a read head of a magnetic stripe reader. In addition, a dynamic magnetic stripe communications device of a card may communicate that amount of data serially to the read head. Multiple tracks of information may be communicated simultaneously to different read-heads of a read-head housing and each track of information may be communicated serially. Different tracks of information may be communicated to a read-head at different times with at least a portion of the information for each track being communicated simultaneously. Accordingly, for example, circuitry (e.g., a processor) of a card may determine a number of leading and/or trailing data bits (e.g., zero valued data bits) that may be necessary to communicate to a magnetic stripe reader to allow the magnetic stripe reader to synchronize with the information communicated by the processor of a card.

A processor of a card may, for example, initiate a serial communication using a predetermined number of leading data bits (e.g., leading zeros) to allow a magnetic stripe reader to determine a presence of the card. A processor of a card may, for example, initiate a serial communication using a predetermined number of leading zeros to allow a magnetic stripe reader to synchronize to track data that may be communicated by a processor of the card. The predetermined number of leading zeros may, for example, be determined by a processor of a card once the type of magnetic stripe reader is detected by the processor. Some magnetic stripe readers may, for example, require more or less leading zeros than other magnetic stripe readers in order to synchronize communications with a card.

Accordingly, for example, a magnetic stripe reader may detect a series of leading zeroes from a card so as to determine a bit rate and/or a bit period of data being communicated by the card. A processor of a card may, for example, determine a minimum number of leading and/or trailing zeroes that may be necessary to synchronize with the magnetic stripe reader. A processor of a card may, for example, determine a minimum number of leading and/or trailing zeroes to communicate to a magnetic stripe reader to minimize an amount of power required to communicate the leading and/or trailing zeroes to the magnetic stripe reader.

A processor of a card may, for example, conclude a serial communication using a predetermined number of data bits (e.g., trailing zeroes) to allow a magnetic stripe reader to determine that track data is no longer being communicated by a processor of a card. A processor of a card may, for example, provide a number of leading zeroes that is different (e.g., greater than) a number of trailing zeroes. A processor of a card may vary a number of leading and/or trailing zeros (e.g., may increase a number of leading zeros) if communication between a card and a magnetic stripe reader fails. Accordingly, for example, a processor of a card may increase a number of leading zeros in an attempt to increase a probability that communication may be successful on a subsequent communication attempt.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 6 is an illustration of process flow charts constructed in accordance with the principles of the present invention.

DETAILED DESCRIPTION OF THE INVENTION

Figure 1:
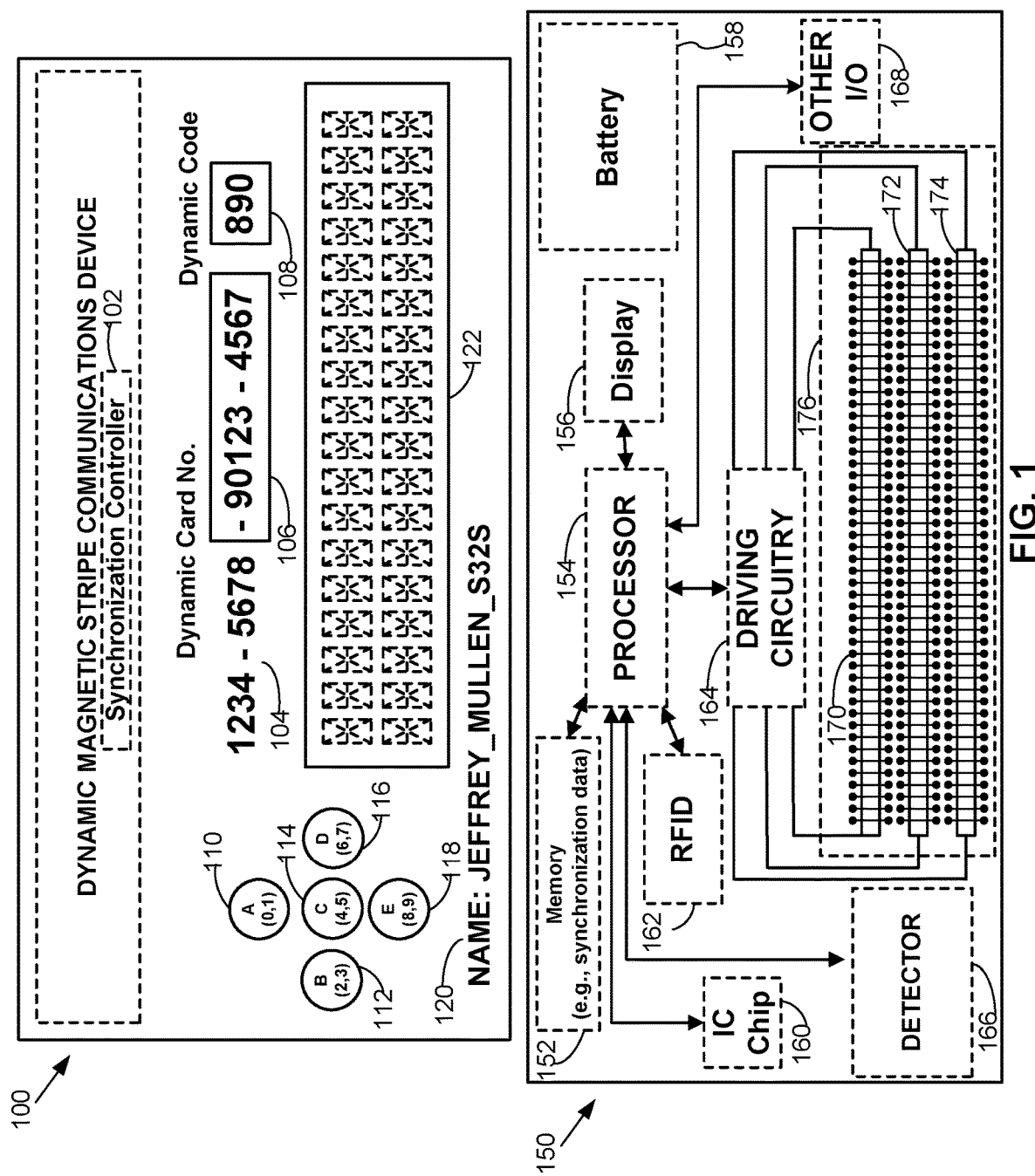
FIG. 1 is an illustration of a card constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may be entirely, or partially, displayed via a second display (e.g., display 108). Display 108 may be utilized, for example, to display a dynamic code such as a dynamic security code. Card 100 may also include third display 122 that may be used to display graphical information, such as logos and barcodes. Third display 122 may also be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electrochromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength.

FIG. 1 shows architecture 150, which may include one or more processors 154. One or more processors 154 may be configured to utilize external memory 152, internal memory of processor 154, or a combination of external memory 152 and internal memory for dynamically storing information, such as executable machine language, related dynamic machine data, synchronization data, and user input data values. Driving circuitry 164 may, for example, receive synchronization data from processor 154 and may communicate the synchronization data to provide communication synchronization between a card (e.g., card 100 of FIG. 1) and a magnetic stripe reader. Such synchronization data may, for example, be stored in memory 152 and may be utilized by processor 154 to provide various synchronization patterns to a magnetic stripe reader.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes.

One or more displays 156 may be, for example, touch sensitive and/or proximity sensitive. For example, objects such as fingers, pointing devices, etc., may be brought into contact with displays 156, or in proximity to displays 156. Detection of object proximity or object contact with displays 156 may be effective to perform any type of function (e.g., transmit data to processor 154). Displays 156 may have multiple locations that are able to be determined as being touched, or determined as being in proximity to an object.

Input and/or output devices may be implemented on architecture 150. For example, integrated circuit (IC) chip 160 (e.g., an EMV chip) may be included within architecture 150, that may communicate information to a chip reader (e.g., an EMV chip reader). Radio frequency identification (RFID) module 162 may be included within architecture 150 to enable the exchange of information with an RFID reader/writer.

Other input and/or output devices 168 may be included within architecture 150, for example, to provide any number of input and/or output capabilities. For example, other input and/or output devices 168 may include an audio device capable of receiving and/or transmitting audible information.

Other input and/or output devices 168 may include a device that exchanges analog and/or digital data using a visible data carrier. Other input and/or output devices 168 may include a device, for example, that is sensitive to a non-visible data carrier, such as an infrared data carrier or an electromagnetic data carrier.

Persons skilled in the art will appreciate that a card (e.g., card 100 of FIG. 1) may, for example, be a self-contained device that derives its own operational power from one or more batteries 158. Furthermore, one or more batteries 158 may be included, for example, to provide operational power for a period of time (e.g., approximately 2-4 years). One or more batteries 158 may be included, for example, as rechargeable batteries.

Electromagnetic field generators 170-174 may be included within architecture 150 to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials (e.g., a magnetic material and/or a non-magnetic material) may be placed outside the coil.

Electrical excitation by processor 154 of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Timing aspects of information exchange between architecture 150 and the various I/O devices implemented within architecture 150 may be determined by processor 154. Detector 166 may be utilized, for example, to sense the proximity and/or actual contact, of an external device, which in turn, may trigger the initiation of a communication sequence. The sensed presence and/or touch of the external device may then be communicated to a controller (e.g., processor 154), which in turn may direct the exchange of information between architecture 150 and the external device. The sensed presence and/or touch of the external device may be effective to, for example, determine the type of device or object detected.

For example, the detection may include the detection of, for example, a read-head of a magnetic stripe reader. In response, processor 154 may activate one or more electromagnetic field generators 170-174 to initiate a communications sequence with, for example, one or more read-heads of a magnetic stripe reader. The timing relationships associated with communications between one or more electromagnetic field generators 170-174 and one or more read-heads of a magnetic stripe reader may be provided through use of the detection of the magnetic stripe reader.

The detection may, for example, include a detection of a read head and its location and/or speed and/or acceleration relative to various areas of a card (e.g., card 100 of FIG. 1). For example, detector 166 may first detect a presence of a read head close to an edge of a card. Detector 166 may, for example, detect a read head and its velocity and/or changes in velocity relative to a card to determine an amount of time that a read head may remain within a communication distance from the card.

Processor 154 may receive location and/or speed and/or acceleration information from detector 166. Processor 154 may determine location and/or speed and/or acceleration information based on information received from detector 166. For example, detector 166 may include several (e.g., approximately 10 to 20) capacitive sensors and processor 154 may determine location and/or speed and/or acceleration information based on information received from these capacitive sensors. For example, processor 154 may receive location and/or speed and/or acceleration information associated with a read head that may be in a proximity or touch relationship with a card. Processor 154 may, for example, use such location and/or speed and/or acceleration information to control driving circuitry 164. Driving circuitry 164 may, for example, receive synchronization data from a synchronization processor to provide an optimum number (e.g., a minimum number) of leading and/or trailing zeroes in a communication sequence. In so doing, for example, the synchronization controller may provide a synchronization sequence to a magnetic stripe reader such that the magnetic stripe reader may synchronize to a bit rate and/or bit period of track data received from a card (e.g., card 100 of FIG. 1).

Persons skilled in the art will appreciate that processor 154 may provide user-specific and/or card-specific information through utilization of any one or more of buttons 110-118, RFID 162, IC chip 160, electromagnetic field generators 170-174, and other input and/or output devices 168.

Figure 2:
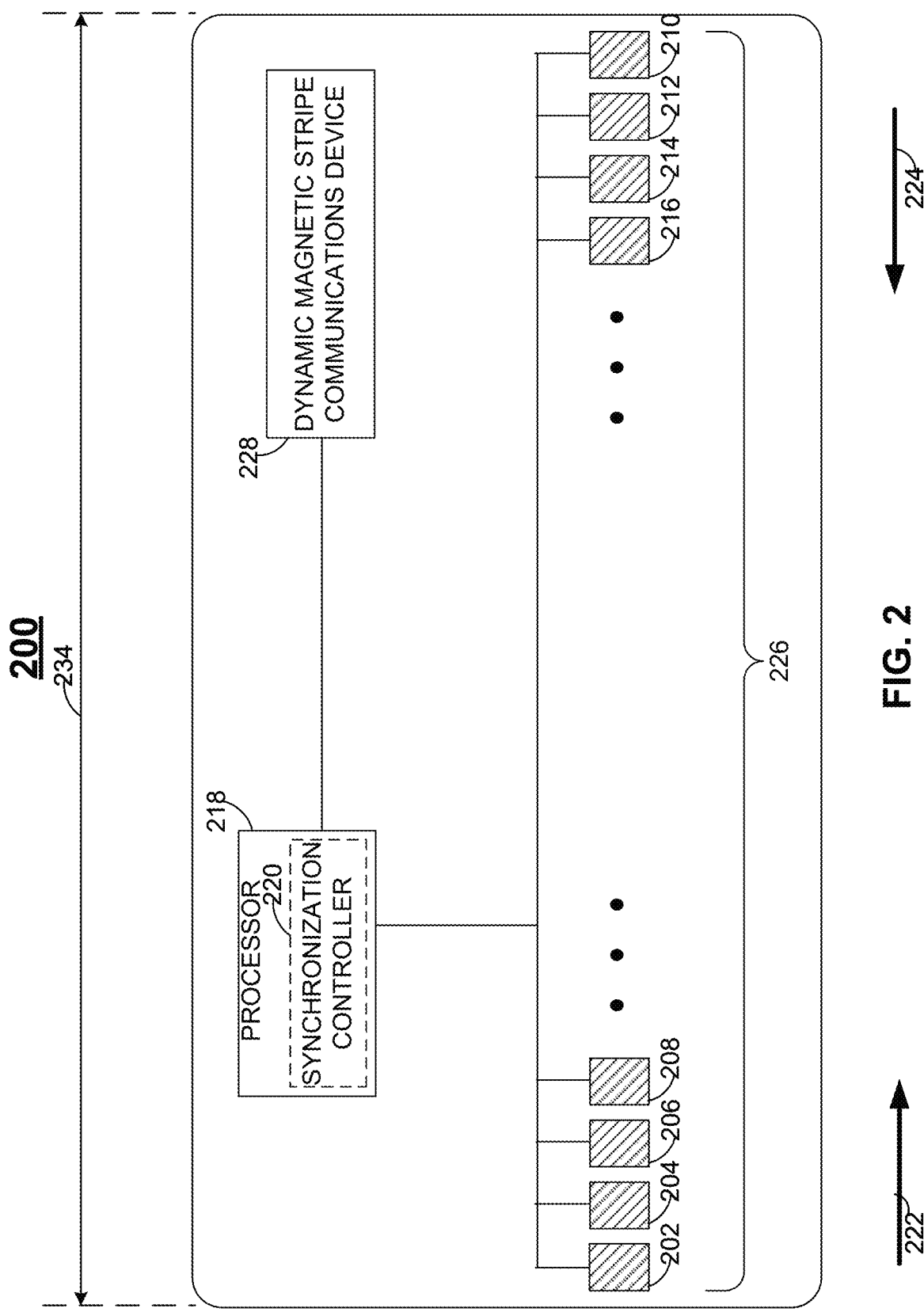
FIG. 2 is an illustration of a card constructed in accordance with the principles of the present invention.

FIG. 2 shows card 200 having an orientation of detectors 226, whereby one or more detectors 202-216 may be, for example, arranged along a length of card 200. Detectors 202-216 may be included, for example, as conductive pads using, for example, an additive technique, whereby patterns of a conductive element (e.g., copper) may be applied to a PCB substrate according to a patterning mask definition layer. Detectors 202-216 may be included, for example, as conductive pads using, for example, a subtractive technique whereby patterns of a conductive element (e.g., copper) may be removed from a pre-plated PCB substrate according to an etching mask definition layer. Other non-PCB fabrication techniques may be used to implement conductive pads 202-216 as may be required by a particular application.

Synchronization controller 220 may be utilized in conjunction with conductive pads 202-216 to detect a location of an object (e.g., a read head of a magnetic card reader) in relation to conductive pads 202-216. In addition, by monitoring a characteristic change (e.g., a capacitance change) associated with one or more conductive pads 202-216 and by comparing a characteristic change of neighboring conductive pads, a position and/or velocity and/or acceleration estimate of an object moving in relation to conductive pads 202-216 may be obtained.

Synchronization controller 220 may calculate position and/or velocity and/or acceleration estimates that may be based on characteristic information. A position estimate, for example, may include an approximation of an initial location of a read head of a magnetic card reader that may be in proximity to, or in contact with, one or more of pads 202-216 as initially detected. A velocity estimate, for example, may include an approximation of a change in position of the read head as it moves across card 200 in either of directions 222 and/or 224. An acceleration estimate, for example, may include an approximation of a change in velocity of the read head as it moves across card 200 in either of directions 222 and/or 224.

Based upon position and/or velocity and/or acceleration estimates, synchronization controller 220 may estimate an amount of time that a detected read head may remain within a communication distance of card 200. In so doing, synchronization controller 220 may, for example, adjust an amount of synchronization information that may be communicated by dynamic magnetic stripe communication device 228. Accordingly, for example, an optimal amount of synchronization data that may be required by a read head of a magnetic card reader to synchronize to card 200 may be provided by synchronization controller 220. An amount of initial synchronization data (e.g., a number of leading zeroes) may be selected that is the same or different (e.g., greater) than an amount of final synchronization data (e.g., a number of trailing zeroes).

Figure 3:
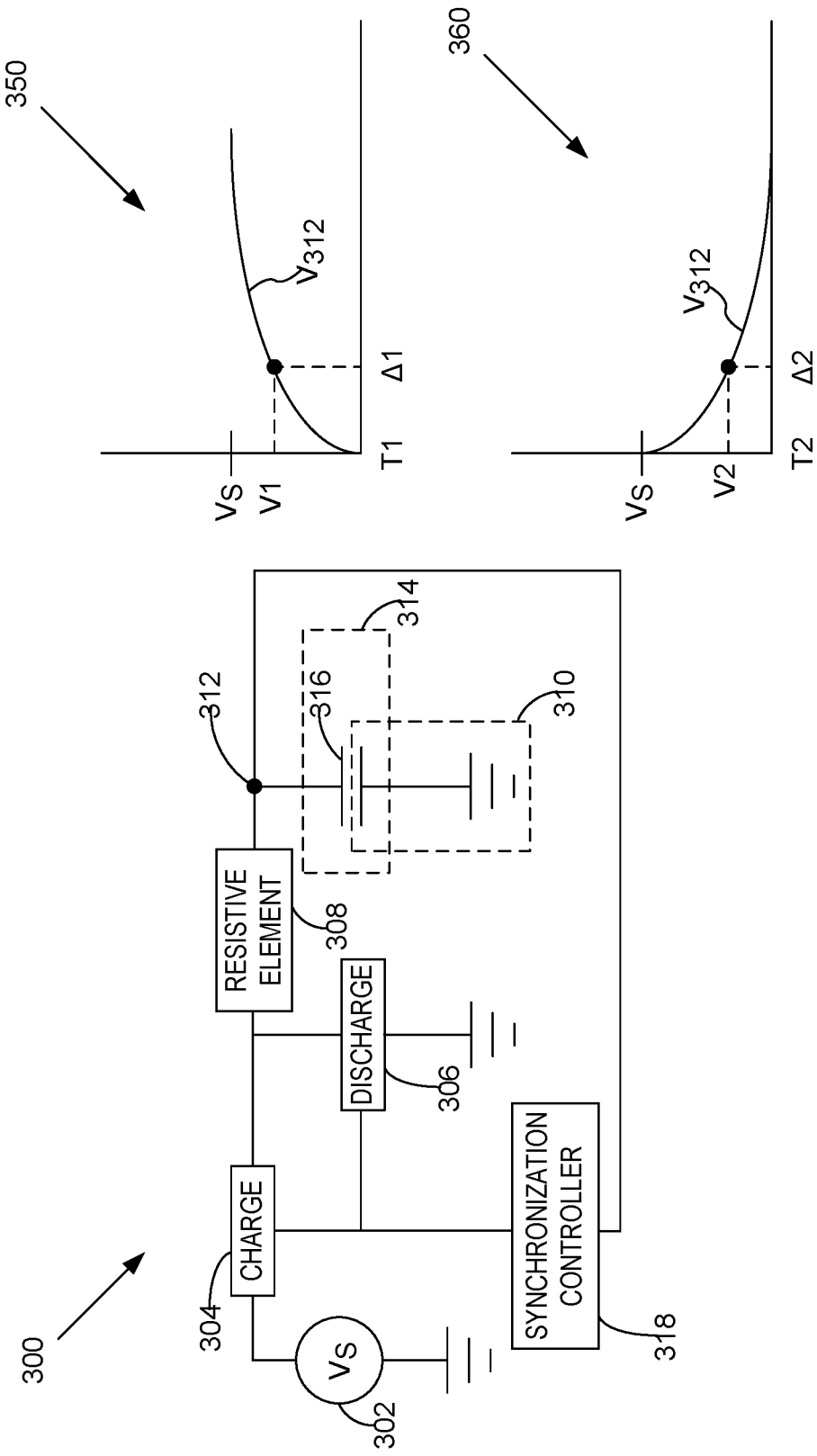
FIG. 3 is an illustration of circuitry, and associated waveforms, constructed in accordance with the principles of the present invention.

FIG. 3 shows a synchronization system that may be included on a card. A conductive pad may be utilized, for example, as a conductor of a capacitive device within a resistor/capacitor (RC) circuit to determine the capacitance of a conductive pad and determine whether it is below, equal to, or above one or more predetermined thresholds.

A conductive pad may, for example, form a portion of a capacitive element, such that plate 316 of capacitive element 314 may be implemented by a pad and the second plate of capacitive element 314 may be implemented by element 310. Element 310 may represent, for example, the device or object whose proximity or contact is sought to be detected.

The capacitance magnitude of capacitive element 314 may exhibit, for example, an inversely proportional relationship to the distance separation between plate 316 and object 310. For example, the capacitance magnitude of capacitive element 314 may be relatively low when the corresponding distance between plate 316 and object 310 may be relatively large. The capacitance magnitude of capacitive element 314 may be relatively large, for example, when the corresponding distance between plate 316 and object 310 may be relatively small.

Detection of the proximity or contact of an object may be accomplished, for example, via circuit 300 of FIG. 3. Through a sequence of charging and discharging events, an average capacitance magnitude for capacitive element 314 may be determined over time. In so doing, the spatial relationship (e.g., the proximity) between plate 316 and object 310 may be determined.

Charge sequence 350 may, for example, be invoked, such that charge circuit 304 may be activated at time T1, while discharge circuit 306 may remain deactivated. Accordingly, for example, current may flow through resistive element 308. In doing so, for example, an electrostatic field may be generated that may be associated with capacitive component 314. During the charge sequence, for example, the voltage at node 312 may be monitored by synchronization controller 318 to determine the amount of time required (e.g., $T_{CHARGE}=\Delta 1-T1$) for the voltage at node 312, $V_{312}$, to obtain a magnitude that is substantially equal to, below, or above a first threshold voltage (e.g., equal to V1).

Discharge sequence 360, for example, may be invoked, such that discharge circuit 306 may be activated at time T2, while charge circuit 304 may remain deactivated. During the discharge sequence, for example, the electric field associated with capacitive element 314 may be allowed to discharge through resistive element 308 to a reference potential (e.g., ground potential). The voltage at node 312 may be monitored by synchronization controller 318 to determine the amount of time required (e.g., $T_{DISCHARGE}=\Delta 2-T2$) for the voltage at node 312, $V_{312}$, to obtain a magnitude that is substantially equal to, below, or above a second threshold voltage (e.g., equal to V2).

Once the charge time, $T_{CHARGE}$, and discharge time, $T_{DISCHARGE}$, are determined, the charge and discharge times may be utilized to calculate a capacitance magnitude that may be exhibited by capacitive element 314. For example, given that the magnitude of voltage, V1, may be equal to approximately 63% of the magnitude of voltage, $V_S$, then a first relationship may be defined by equation (1) as:

$$T_{CHARGE} = R_{308} * C1, \quad (1)$$

where $R_{308}$ is the resistance magnitude of resistive element 308 and C1 is proportional to a capacitance magnitude of a capacitive element (e.g., capacitive element 314).

Similarly, for example, given the magnitude of voltage, V2, is equal to approximately 37% of the magnitude of voltage, $V_S$, then a second relationship may be determined by equation (2) as:

$$T_{DISCHARGE} = R_{308} * C2, \quad (2)$$

where C2 is proportional to a capacitance magnitude of capacitive element 314. The capacitance magnitudes, $C_1$ and $C_2$, may then be calculated from equations (1) and (2), respectively, and averaged to determine an average capacitance magnitude that is exhibited by capacitive element 314.

Circuits 304 and 306 may be activated and deactivated by synchronization controller 318. Accordingly, for example, synchronization controller 318 may control when the charge and discharge events occur. Synchronization controller 318 may adjust a frequency at which circuits 304 and 306 may be activated and/or deactivated, thereby adjusting a sampling rate at which the capacitance magnitudes, $C_1$ and $C_2$, may be measured. In so doing, a sampling rate (e.g., a lower sampling rate) may be selected in order to select a power consumption rate (e.g., a lower power consumption rate) of a card.

Turning back to FIG. 2, a series of charge and discharge sequences for pads 202-216 may be executed to determine, for example, a relative capacitance magnitude that is exhibited by each of pads 202-216. A series of charge and discharge sequences for each of pads 202-216 may be executed, for example, in order to obtain a capacitance characteristic for each of pads 202-216 over time.

By comparing the time-based capacitance characteristic of each pad 202-216 to a threshold capacitance value, a determination may be made, for example, as to when pads 202-216 are in a proximity, or touch, relationship with a device whose presence is to be detected. For example, a sequential change (e.g., increase) in the relative capacitance magnitudes of pads 202-208, respectively, and/or pads 216-210, respectively, may be detected. In so doing, a determination may be made that a device is moving substantially in direction 222 relative to card 200. A sequential change (e.g., increase) in the relative capacitance magnitudes of pads 210-216, respectively, and/or 208-202, respectively, may be detected. In so doing, a determination may be made that a device is moving substantially in direction 224 relative to card 200.

Persons skilled in the art will appreciate that by electrically shorting pairs of pads together (e.g., pair 202/210, pair 204/212, pair 206/214, etc.) directional vectors 222 and 224 become insubstantial. For example, regardless of whether a device is moving substantially in direction 222 or substantially in direction 224 relative to card 200, a determination may nevertheless be made that a device is close to, or touching, card 200.

Synchronization controller 220 may be used in conjunction with and one or more pads 202-216, for example, to determine that a device (e.g., a read-head housing of a magnetic stripe reader) is in close proximity, or touching, one or more of pads 202-216. In addition, synchronization controller 220 may determine a velocity of the detected device in either of directions 222 and/or 224. In addition, synchronization controller 220 may determine an acceleration of the detected device in either of directions 222 and/or 224. Once a device is detected, synchronization controller 220 may prepare, for example, dynamic magnetic stripe communications device 228, for communications with the detected device.

Preparation for communication, for example, may include an estimate of an amount of time that an object (e.g., a read head) may remain within a communication distance of card 200. For example, a length of card 200 may be, for example, approximately equal to 3.375 inches. A communication distance may, for example, be defined as any distance between an edge of card 200 and a detected location of, for example, a read head of a magnetic card reader within distance 234. A velocity estimate may, for example, be calculated by synchronization controller 220 as a rate of change of the detected location of the read head relative to card 200 over a period of time. The communication distance may then be divided by the estimated velocity of the read head to determine a communication time window that may be used by dynamic magnetic stripe communications device 228 of card 200 to communicate to the read head.

If, for example, a read head was initially detected by synchronization controller 220 of card 200 at pad 202 moving in direction 222, then the communication distance may be maximized, since the read head may be estimated to be within a proximity to card 200 for nearly the full length 234 of card 200. The communication time window may similarly be maximized, since the ratio of communication distance to estimated velocity is maximized.

Conversely, for example, if a read head was initially detected by synchronization controller 220 of card 200 at pad 210 moving in direction 222, then the communication distance may be minimized, since the read head may be estimated to be within a proximity to card 200 for a relatively short distance (e.g., the distance between pad 210 and the edge of card 200). The communication time window may similarly be minimized, since the ratio of communication distance to velocity is minimized.

A velocity estimate may be computed by synchronization controller 220. For example, by measuring an amount of time that a read head moves in relation to card 200 from one pad (e.g., pad 202) to another pad (e.g., pad 204) and by dividing the distance that exists between pads 202 and 204 by that amount of time, a velocity of the detected read head may be estimated.

A number of data bits may, for example, be communicated by dynamic magnetic stripe communications device 228 of card 200 to an object (e.g., a read head of a magnetic card reader). For example, the communicated data may be magnetic stripe data (e.g., Track 1, Track 2, and/or Track 3 data) that may be communicated to a detected read head by dynamic magnetic stripe communications device 228. In addition, a synchronization sequence (e.g., a number of zeroes preceding the magnetic stripe data and a different number of zeroes trailing the magnetic stripe data) may be communicated by dynamic magnetic stripe communications device 228 of card 200 to a read head of a magnetic card reader.

A read head position, velocity and/or acceleration detection by synchronization controller 220 of card 200 may result in an estimated communication time window that may be used to communicate the magnetic stripe data and synchronization data. Such an estimate may be calculated by synchronization controller 220, for example, by determining that a read head may be moving in a certain direction at a certain velocity and that the read head's position may be first detected in proximity to a certain pad (e.g., pad 208). Given that a distance (e.g., two inches) may exist between pad 208 and the opposite edge of card 200, then an approximate communication time window may be calculated.

Accordingly, for example, synchronization controller 220 may compute a number of leading zeroes that may precede the magnetic stripe data and a number of trailing zeroes that may extend beyond the end of the magnetic stripe data to be compliant with a communication time window as may be calculated by synchronization controller 220. A number of leading zeroes may, for example, be selected by synchronization controller 220 to insure that a magnetic card reader synchronizes with track information communicated by card 200. A number of trailing zeroes may, for example, be selected by synchronization controller 220 to insure proper operation with a magnetic card reader while at the same time minimizing an amount of energy required to communicate the trailing zeroes.

Figure 4:
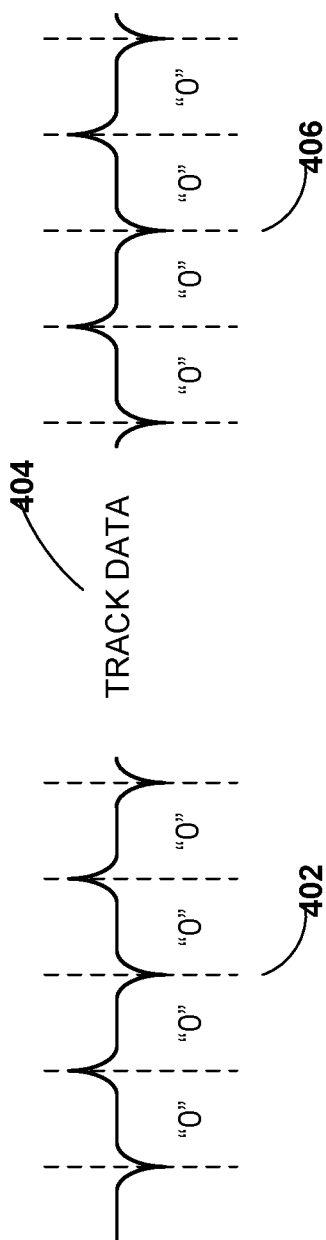
FIG. 4 is an illustration of a synchronization waveform constructed in accordance with the principles of the present invention.

FIG. 4 shows a communication sequence that may include preceding zeroes 402, magnetic track data 404, and succeeding zeros 406. The communication sequence of FIG. 4 may be computed by a synchronization controller (not shown) of a card where a minimum number of preceding zeroes (e.g., four) and a minimum number of succeeding zeroes (e.g., four) may be selected to precede and trail, respectively, magnetic track data 404 during a communication sequence. A synchronization controller (not shown) of a card may, for example, determine that only a minimum communication time window exists and that only a minimum synchronization sequence (e.g., a minimum number of preceding and succeeding zeroes) may be supported by the communication time window.

Figure 5:
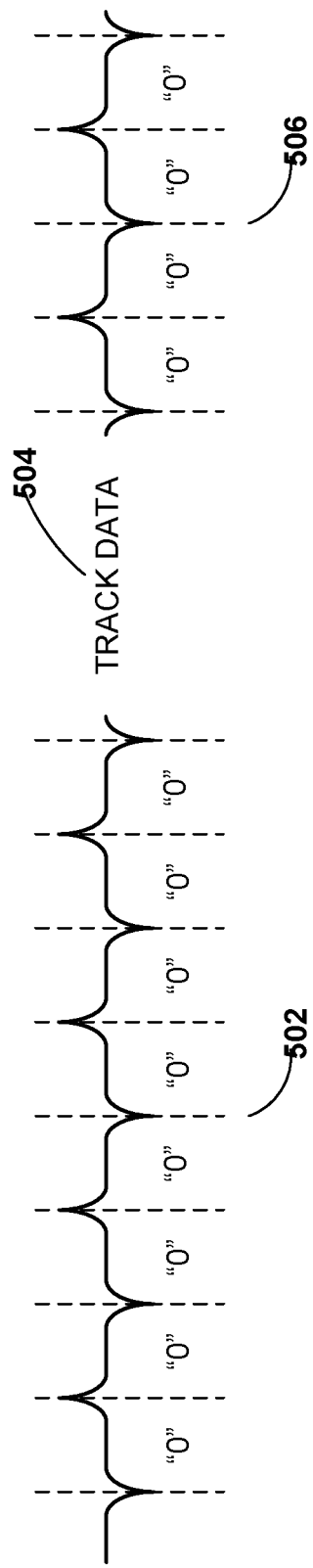
FIG. 5 is an illustration of a synchronization waveform constructed in accordance with the principles of the present invention.

FIG. 5 shows a communication sequence that may include preceding zeroes 502, magnetic track data 504, and succeeding zeros 506. The communication sequence of FIG. 5 may be computed by a synchronization controller (not shown) of a card where a number of preceding zeroes and a number of succeeding zeroes may be selected to precede and trail, respectively, magnetic track data 504 during a communication sequence where the number of preceding zeroes 502 is different (e.g., greater) than a number of succeeding zeroes. A synchronization controller (not shown) of a card may, for example, determine that a communication time window exists that may support a synchronization sequence (e.g., a number of preceding and succeeding zeroes) that is greater than a minimum number of preceding and succeeding zeroes that may be required for a communication sequence.

Accordingly, for example, a synchronization controller (not shown) of a card may increase a number of preceding zeroes communicated to a magnetic stripe reader to insure synchronization with the magnetic stripe reader. A synchronization controller (not shown) of a card may decrease a number of succeeding zeroes communicated to a magnetic stripe reader to insure synchronization with the magnetic stripe reader while at the same time conserving an amount of power needed to maintain synchronization with the magnetic stripe reader.

A flow diagram of communication sequences is shown in FIG. 6. Step 611 of sequence 610 may, for example, detect a position of an object (e.g., a read head of a magnetic card reader) that may be in a proximity or touch relationship with a card. Step 612 may, for example, detect position variations of the object over time to determine a velocity of the object. Step 613 may, for example, detect velocity variations of the object over time to determine an acceleration of the object.

A communication time window may be calculated by a synchronization controller on a card (e.g., as in step 614) based upon several factors (e.g., length of a card, velocity of read head movement relative to the card, and initially detected position of a read head). In step 615, a synchronization controller of a card may, for example, determine a number of synchronization bits that may be communicated with magnetic track data to fit within the communication time window as may be calculated in step 614.

In step 621 of sequence 620, a communication time window may be calculated by a synchronization controller and a number of leading and trailing zeroes may be selected in steps 622 and 623. A number of trailing zeroes may be selected to be different than a number of leading zeroes. A number of leading zeroes may, for example, be selected to be greater than a number of trailing zeroes (e.g., the number of trailing zeroes may be decreased from an originally selected number to a minimally acceptable number). Accordingly, for example, synchronization between a card and a magnetic stripe reader may be maintained while preserving an amount of power that would have otherwise been expended in communicating an unnecessary number of trailing zeroes.

Persons skilled in the art will appreciate that the present invention is not limited to only the embodiments described. Instead, the present invention more generally involves dynamic information and the exchange thereof. Persons skilled in the art will also appreciate that the apparatus of the present invention may be implemented in other ways than those described herein. All such modifications are within the scope of the present invention, which is limited only by the claims that follow.

The invention claimed is:

1. A payment device comprising:
a detector operable to sense an external device and provide a signal indicating a presence of the sensed external device;
a motion sensor operable to sense at least one parameter of motion of the payment device with respect to the sensed external device;
a synchronization controller operable to generate data and initialize communication based on the signal and the sensed at least one parameter of motion; and
a communication device operable to communicate the data, wherein the data comprises a number of leading synchronization bits and a number of trailing synchronization bits, wherein the synchronization controller is operable to determine the number of leading synchronization bits and the number of trailing synchronization bits based on the signal and the sensed at least one parameter of motion, and wherein the number of leading synchronization bits is greater than the number of trailing synchronization bits.

2. The payment device of claim 1, wherein the detector comprises a plurality of conductive pads.

3. The payment device of claim 1, wherein the detector comprises a plurality of conductive pads arranged along the length of the device.

4. The payment device of claim 1, the detector comprises a plurality of conductive pads arranged along the length of the device; and
the synchronization controller is operable to detect position variations of a read head in relation to the device based on signals from the plurality of conductive pads.

5. The payment device of claim 1, wherein:
the detector comprises a plurality of conductive pads arranged along the length of the device; and
the synchronization controller is operable to detect position variations of a read head in relation to the device based on signals from the plurality of conductive pads and calculate a time window to communicate the data to the read head based on said position variations.

6. The payment device of claim 1, wherein the data comprises a number of trailing synchronization bits.

7. The payment device of claim 1, wherein: the data comprises a number of trailing synchronization bits; and the number of trailing synchronization bits is different than the number of leading synchronization bits.

8. The payment device of claim 1, wherein:
the data comprises a number of trailing synchronization bits; and
the number of leading synchronization bits greater than the number of trailing synchronization bits.

9. The payment device of claim 1, wherein:
the detector comprises a plurality of conductive pads arranged along the length of the device; and
the synchronization controller is operable to detect position variations of a read head in relation to the device based on signals from the plurality of conductive pads and determine a velocity of the read head in relation to the device.

10. The payment device of claim 1, wherein:
the detector comprises a plurality of conductive pads arranged along the length of the device; and
the synchronization controller is operable to detect position variations of a read head in relation to the device based on signals from the plurality of conductive pads and determine an acceleration of the read head in relation to the device.

11. The payment device of claim 1, wherein:
the detector comprises a plurality of conductive pads arranged along the length of the device; and
the synchronization controller is operable to detect position variations of a read head in relation to the device based on signals from the plurality of conductive pads and determine a velocity and an acceleration of the read head in relation to the device.

12. The payment device of claim 1, wherein:
the detector comprises a plurality of conductive pads arranged along the length of the device; and
the synchronization controller is operable to detect position variations of a read head in relation to the device based on signals from the plurality of conductive pads and determine a position, a velocity, and an acceleration of the read head in relation to the device.

13. The payment device of claim 1, wherein:
the detector comprises a plurality of conductive pads arranged along the length of the device;
the synchronization controller is operable to detect position variations of a read head in relation to the device based on signals from the plurality of conductive pads and determine a position, a velocity, and an acceleration of the read head in relation to the device;
the position is an estimated position, the velocity is an estimated velocity, and the acceleration is an estimated acceleration.

14. The payment device of claim 1, wherein:
the detector comprises a plurality of conductive pads arranged along the length of the device; and
the synchronization controller is operable to detect position variations of a read head in relation to the device based on signals from the plurality of conductive pads and calculate a time window to communicate the data to the read head based on said position variations; and
the time window is at least an estimated amount of time that the read head will remain within a communication distance of the device.

15. The payment device of claim 1, wherein the leading synchronization bits are usable by a card reader to synchronize to the data.

16. The payment device of claim 1, wherein:
the data comprises a number of trailing synchronization bits; and
the leading synchronization bits and trailing synchronization bits are usable by a card reader to synchronize to the data.

17. The payment device of claim 1, wherein the leading synchronization bits are usable by a card reader to synchronize to the data; and
a synchronization, by the synchronization controller, is at least based on one selected from the group consisting of a bit rate, a bit period, and a combination thereof.

18. The payment device of claim 1, wherein:
the data comprises a number of trailing synchronization bits; the trailing synchronization bits are usable by a card reader to synchronize to the data; and
a synchronization, by the synchronization controller, is at least based on one selected from the group consisting of a bit rate, a bit period, and a combination thereof.

19. The payment device of claim 1, wherein:
the data comprises a number of trailing synchronization bits;
the leading synchronization bits and the trailing synchronization bits are usable by a card reader to synchronize to the data; and
a synchronization, by the synchronization controller, is at least based on one selected from the group consisting of a bit rate, a bit period, and a combination thereof.

20. The payment device of claim 1, wherein:
the detector comprises a plurality of conductive pads arranged along the length of the device;
the synchronization controller is operable to detect position variations of a read head in relation to the device based on signals from the plurality of conductive pads and calculate a time window to communicate the data to the read head based on said position variations;
the number of leading synchronization bits is based on said time window.

* * * * *